Dec. 12, 1939.   R. K. PEPPER ET AL   2,182,995
EXPANSION PIPE JOINT
Filed April 18, 1938   2 Sheets-Sheet 1
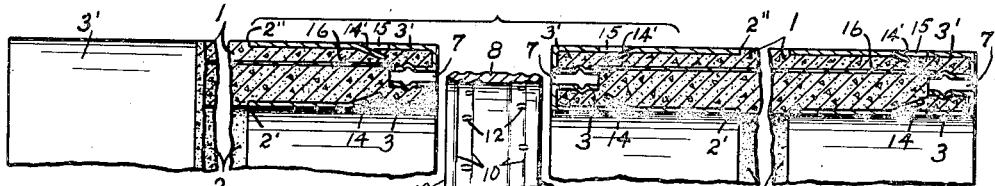
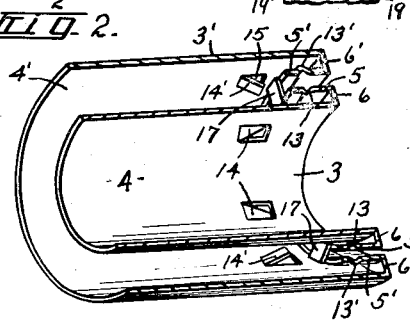
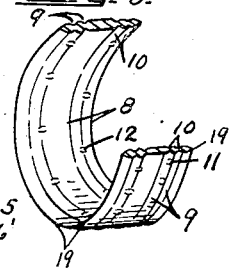
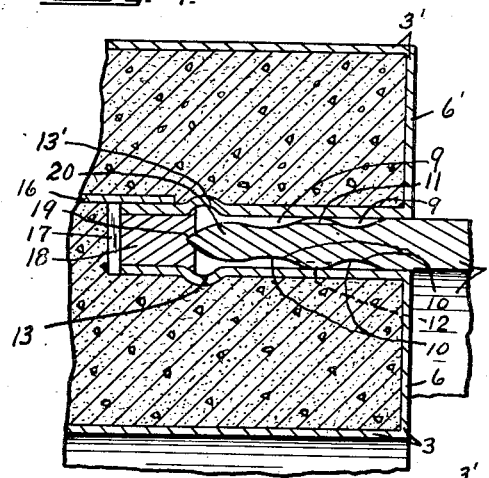
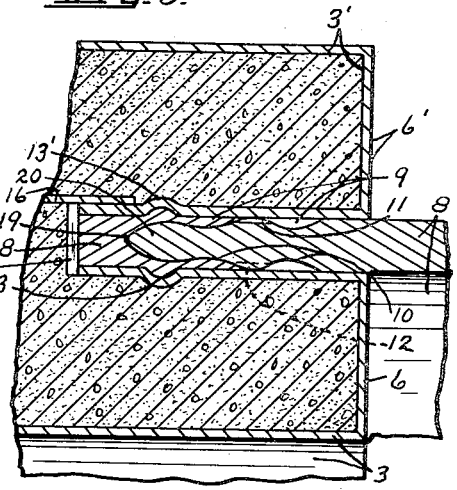
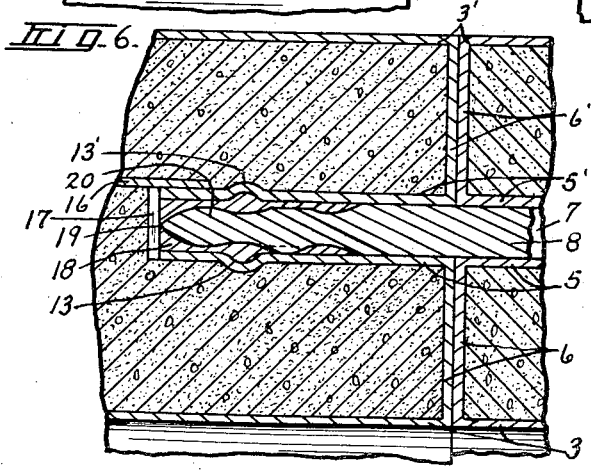
INVENTORS
Robert K. Pepper
Samuel P. V. Pepper
BY
Theodore C. Simonton
ATTORNEY Dec. 12, 1939.    R. K. PEPPER ET AL    2,182,995
EXPANSION PIPE JOINT
Filed April 18, 1938    2 Sheets-Sheet 2
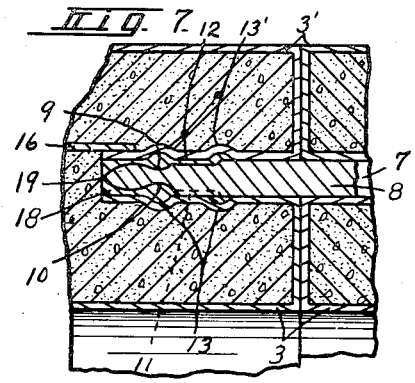
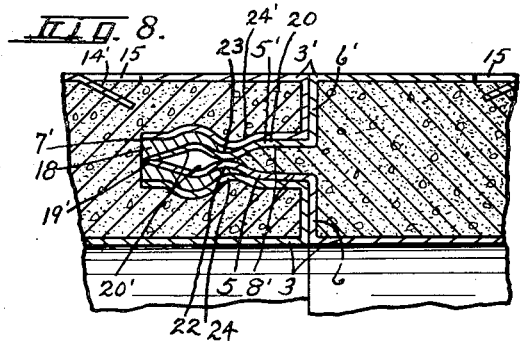
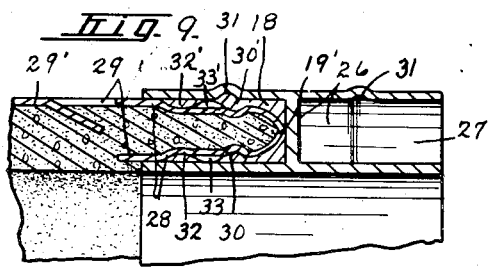
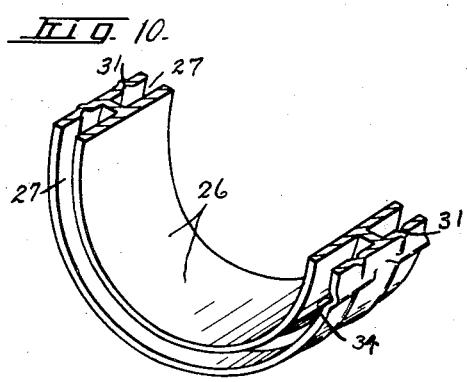
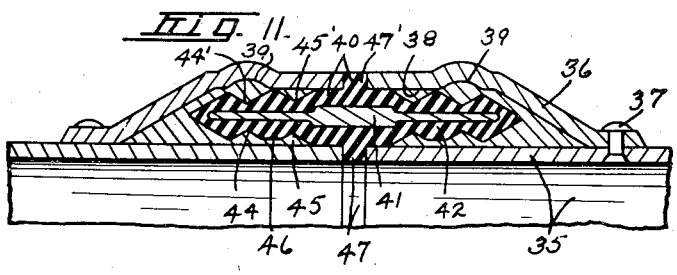
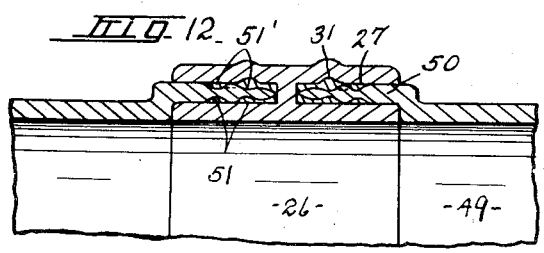
INVENTORS
Robert K. Pepper
Samuel C. V. Pepper
BY
Theodore E. Simonton
ATTORNEY Patented Dec. 12, 1939

2,182,995

UNITED STATES PATENT OFFICE 2,182,995

EXPANSION PIPE JOINT

Robert K. Pepper and Samuel C. V. Pepper, Syracuse, N. Y.

Application April 18, 1938, Serial No. 202,749

8 Claims. (Cl. 285—112)

This invention relates to improvements in an expansion pipe joint and pertains more particularly to means for joining lengths of concrete pipe to one another.

The main objects of this invention are to provide a concrete pipe structure which is simple, economical and durable, and whereby the lengths of the pipe may be quickly and easily assembled or joined in cooperative relation with each other in a liquid tight manner.

In carrying out the above mentioned objects and in the preferred embodiment of the invention, we have provided a concrete pipe composed of lengths having the ends thereof of similar construction, whereby either end is adapted to be connected with a given end of an adjacent length. Each of the ends of the lengths is also reinforced by an outer and an inner metal band or ferrule of substantially U-shaped construction whereby the pipes may be handled or transported without danger of cracking or chipping the ends thereof. These ferrules are arranged in spaced relation to each other radially to form an annular groove between them, extending inwardly from the corresponding end of the length, for the reception of a connecting ring adapted to be arranged between adjacent lengths. Furthermore, we have provided the circumferential surfaces of the grooves and the portions of the ring received therein with cooperating annular recesses providing annular chambers intermediate the ring and the circumferential surfaces of the groove, for the reception of a suitable filler or sealing material, to provide a liquid tight seal between said ends of the pipe lengths and the sealing ring.

Other objects and advantages pertaining to the details of the structure, and to the arrangement and function of the parts thereof, will more fully appear from the following description taken in conjunction with the accompanying drawings in which:

Figure 1 is a detail longitudinal sectional view, partly in elevation, of a pipe structure embodying the various features of this invention, said view illustrating two lengths of pipe arranged in slightly spaced relation to each other with a portion of a connecting ring arranged in cooperative alignment therewith and with the intermediate portions of the pipe broken away.

Figure 2 is a perspective view illustrating one-half portions of the reinforcement members on the ends of the pipe lengths shown in Figure 1, in cooperative relation with each other, and with the cement portion of the pipe omitted.

Figure 3 is a perspective view of the connecting ring shown in Figure 1, with a portion thereof broken away.

Figures 4, 5 and 6 are enlarged detail sectional views of end portions of our novel pipe structure together with the adjacent portion of the connecting ring associated therewith and illustrating respectively successive steps taken in the assembling of the connecting ring with the pipe.

Figure 7 is a detail sectional view, similar to Figure 6, illustrating a slightly modified form of connecting ring and the groove associated therewith.

Figure 8 is a view similar to Figure 7, illustrating a still further modification of the invention.

Figure 9 is a detail sectional view illustrating another form of the invention.

Figure 10 is a perspective view of a portion of the clamping ring illustrated in Figure 9.

Figures 11 and 12 are detail sectional views illustrating still further modifications of the present invention.

In the preferred form of my invention as illustrated in Figures 1 to 6 inclusive of the drawings, each pipe section or length, as 1, has the ends thereof constructed substantially alike so as to be interchangeable during the laying of the pipe. Each of these pipe sections or lengths 1 comprises a main body portion 2 composed of concrete and which may be of any suitable length or diameter. Each end of a length 1 is provided with an inner and an outer ferrule 3 and 3' respectively, composed of sheet metal or any other suitable material. Each of these ferrules is of substantially U-shaped structure in cross section; that is, each ferrule comprises a relatively long cylindrical portion 4 or 4' and a relatively short cylindrical portion 5 or 5', joined at one end with a corresponding end of the other cylindrical portion by an annular wall or plate 6 or 6'. The relatively long cylindrical portion 4 of the inner ferrule 3 is arranged at the inside of the ferrule, while the relatively long cylindrical portion 4' of the outer ferrule 3' is arranged at the outside of the ferrule surrounding the relatively short cylindrical portion 5'. The lengths of the cylindrical portions 4 and 4' may, as shown, be substantially equal while the lengths of the cylindrical portions 5 and 5' are practically equal to each other. These ferrules are arranged as hereinbefore indicated, one within the other with the cylindrical portion 4 of the inner ferrule extending longitudinally of the body portion 2 of the pipe in a suitable recess 2' formed in the inner wall of said body portion, so that the inner surface of the cylindrical portion 4 is substantially flush with the inner surface of the body portion 2 of the pipe. Likewise, the cylindrical portion 4' of the outer ferrule 3' is preferably arranged in a suitable recess 2" formed in the outer peripheral surface of the body portion 2, adjacent the ends thereof. It is thus seen that both the outer and inner surface of each pipe length 1 is substantially smooth and of equal cross sectional area throughout the length thereof. The short cylindrical portions 5 and 5' of the ferrules may, as shown in Figures 2, 4, 5 and 6, be connected to each other at their inner ends by tie plates or members 17 connected to those portions by electric welding, or the like, to maintain them in predetermined spaced relation to each other. The spacing of the relatively short cylindrical portions 5 and 5' of the ferrules from each other provides each end of a pipe length when the ferrules are secured in the body portion 2 with an inwardly extending annular channel or groove 7. These grooves 7 are arranged concentric with the pipe substantially midway between the outer and inner surfaces of the wall thereof and are adapted to receive therein a respective end portion of a connecting ring 8, having an axial length substantially equal to twice the length or depth of an annular groove 7.

These rings 8 may be composed of any suitable material, such as steel, wrought iron, wood or the like, depending upon the diameter of the pipe and the stresses to which they are subjected, and also upon the character of material passing through the pipes or which may come in contact with the outside thereof. The thickness of each ring 8 is substantially equal to or slightly less than the width of a groove 7, so that the ring will have a close sliding fit in said groove. The ring 8, as shown, has each end portion thereof which is received within a channel or groove 7, provided with a pair of annular recesses 9 in the outer peripheral surface thereof and a pair of similar recesses 10 in the inner surface. These recesses 9 and 10 of each pair are arranged in axially spaced relation with each other a relatively short distance from the corresponding end of the ring.

Each pair of recesses 9 and 10 is connected with each other by a multiplicity of cross recesses 11 and 12 respectively, which are arranged in the corresponding outer and inner surfaces of the ring intermediate the circumferential recesses and in circumferentially spaced relation to each other. These annular recesses 9 and 10 may be cut, pressed or otherwise formed in the outer and inner peripheral surfaces of the ring. The relatively short cylindrical portions 5 and 5' of the ferrules 4 and 4' are shown provided with annular recesses 13 and 13' in their adjacent surfaces intermediate the ends thereof. These recesses 13 and 13' are preferably arranged in opposed relation with each other, to be in alignment with corresponding recesses 9 and 10 formed in the ring 8 adjacent to the central portion of the ring when said ring is in its innermost position within the grooves 7.

In order that the ferrules may be securely anchored to the concrete body portion 2 of the corresponding pipe section, we have shown the cylindrical portion 4 and 4' thereof provided with a plurality of laterally projecting tongues or bosses 14 and 14', respectively, stamped or pressed out from these portions so as to extend into the concrete body 2, as illustrated in Figures 1 and 2. The tongue portions 14 and 14' also provide openings 15 and 15', respectively, in the members 4 and 4' which are adapted to receive therein suitable clamps, or other fastening means, by which the pipe sections or lengths may be moved longitudinally toward each other during the assembling of said lengths with the connecting ring 8.

While the bosses 14 and 14' are shown pressed up from the ferrules, it will be understood that they may be connected with the ferrules by other means such as by electric welding and they may be arranged in any other desired order or position with respect to the ferrules and to each other.

In concrete pipe or conduit of the type under consideration, it is sometimes desirable and often necessary to provide a reinforcing member which is usually imbedded in the body portion of the pipe during the formation thereof. This reinforcing member 16, as illustrated in the drawings, comprises a cylindrical drum composed of sheet metal and has the ends thereof secured in any suitable manner, as by riveting, electric welding or the like, to the inner end portion of the cylindrical member 5' of the outer ferrule 3'. It will be understood, however, that this reinforcing member may be similarly secured to the portion 4' of the outer ferrule or to a corresponding portion of the inner ferrule 4. This cylindrical member 16 extends longitudinally through the body portion 2, and inasmuch as said member is connected to the outer ferrule 3', these ferrule members are obviously securely tied together in fixed predetermined spaced relation to each other by said reinforcing cylinder. It will be understood, also, that this reinforcing cylinder may be composed of wire mesh, or of rods extending longitudinally through the body portion of the pipe or may be of any other suitable construction for reinforcing the concrete wall of the pipe.

After each length of concrete pipe is formed, the grooves 7 are partially filled with a suitable filler or sealing material 18 composed of bitumen or any mixture having a base of bitumen, tar, pitch, etc. which when cold will remain in a solid or semi-solid, that is, a more or less plastic, state. Or we may use a relatively soft, more or less metallic substance composed of lead or having a lead base which during the insertion of the connecting ring 8 with sufficient pressure into a groove 7 will move or flow to opposite sides of the ring and fill the recesses 9 and 10 in the ring and 13 and 13' in the walls of the groove. The amount of the sealing material 18 provided in each groove 7 is preferably sufficient to thoroughly seal said groove when the connecting ring 8 is inserted therein. In order that the ring may enter the sealing material during the assembling of the ring with the pipe lengths, each end portion of the ring is preferably tapered as at 19, while the thickness of the portion of the ring as 20, between the end 19 and the adjacent annular recesses 9 and 10 is preferably slightly less than the width of the groove 7 or normal thickness of the ring, as clearly illustrated in Figures 4, 5 and 6, to permit the passage of the sealing material into the grooves 9 and 10 adjacent each end 19.

By referring to Figures 4, 5 and 6, the manner in which the ring 8 enters the groove 7 and the sealing material is equally distributed to opposite sides of the ring for thoroughly and completely sealing the passage through the groove around the ring, will be understood to be substantially as follows:

Assuming that a portion of the pipe has been laid and it is desired to add a length to said portion, this length is brought into alignment with the laid portion with either end thereof arranged in slightly spaced relation with the forward or free end of the laid pipe. A connecting ring 8 is then positioned between the adjacent ends of the lengths, with one end portion thereof entered into the groove 7 of one of said lengths; that is, in either the groove contained in the pipe already laid or in the one about to be laid. Or, the ring may be temporarily supported by any suitable means between the pipe lengths in alignment with the grooves 7. It will be understood that the ends of the ring may be readily inserted in groove 7 due to the outer end portion 20 thereof being of less thickness than the width of the groove. The pipe length being laid is then moved longitudinally toward the ring by any suitable means, as by clamps not shown, engaging in the openings 15 in the outer ferrule 3'. As the pipe section being laid moves axially toward the section already laid, the free end of the connecting ring will enter the unoccupied groove or grooves 7. During the initial entrance of the ring in the groove, the pipe being laid may have a limited swinging movement with respect to the laid portion of the pipe, due to the relatively loose fit of the end portions 20 of the ring in the grooves. However, as the length being laid approaches nearer the laid section, the same will be brought into substantially co-axial alignment with the laid section as the portions of the ring at opposite sides of the inner positioned recesses 9 and 10 engage in the grooves, due to the thickness of these portions of the ring being substantially equal to the width of the grooves. As the section being laid is thus aligned with the laid section, the outer ends of the ring will be brought to the position illustrated in Figure 4, into contact with the sealing material 18 provided at the inner ends of the grooves. As the axial movement of the pipe sections being laid is continued toward the laid section, the relatively short pointed ends 19 of the ring will penetrate the sealing material 18 and divide said material substantially equally at opposite sides of the ring, due to the pointed ends 19 being maintained substantially midway between the inner and outer walls of the grooves.

The sealing material in each groove is caused to flow outwardly as the same is displaced by the inner movement of the sealing ring, until the ring reaches the position illustrated in Figure 5, when said sealing material fills the recesses 13 and 13' in the walls of the groove and the recesses 9 and 10 positioned adjacent the outer ends of the sealing ring.

The entrance of the connecting or sealing ring into the groove 7 up to this point may be accomplished with a relatively little pressure or strain exerted upon the pipe sections, particularly when using a sealing material which flows relatively easily, due partly to the ease in which the material may flow around the reduced end portions 20 of the sealing ring. Continued movement of the pipe length being laid toward the laid section from this point until the ring is fully inserted in the grooves 7 will be accomplished with a relatively high degree of stress or pressure upon the pipe sections. This is due to the fact that the sealing material must necessarily pass through the cross grooves or recesses 11 and 12 provided in the outer and inner circumferential surfaces of the sealing ring between each pair of circumferential recesses 9 and 10. The resistance to the flow thus offered to the sealing material in passing from the recesses in the outer end portions of the connecting ring to the inner positioned recesses causes the material to be thoroughly distributed throughout the entire area of the outer positioned recesses 9 and 10 and thereby thoroughly sealing the outer end portions of the sealing ring. That is, the sealing material is urged toward the upper portion of the pipe and seals the ring therein, as well as at the bottom of the pipe where the sealing material may have a tendency to flow. As the pipe being laid is drawn toward the laid section, the sealing material will be forced through the cross recesses 11 and 12 into the inner positioned annular recesses 9 and 10, so that as the pipe being laid comes into contact with, or into close proximity to, the laid section the outer portions of the connecting ring will be completely sealed in the grooves 7 by the sealing material, due to said material completely filling the recesses 11 and 12 and 13 and 13' formed in the ring and walls of the grooves throughout the circumferential area thereof. After the pipe section or length being laid is thus brought into close relation with the laid section, the same is held in this position by the clamps, or other means for producing a relative movement of the pipe sections toward each other, until the resistance offered by the sealing material to the displacement thereof has subsided so that the pipe lengths will not be separated from each other by said action of the sealing material. Any sealing material placed in the grooves 7 in excess of that required to fill the spaces around the ring 8 will be forced to pass between the ring and walls 5 and 5' out of the grooves as the ring becomes fully seated therein.

It will now be observed that if the sealing material is of a character that the base substance is maintained in a plastic state by a liquid solvent such as oil, the sealing material will become more or less hardened during the insertion of the ring due to a portion of the solvent being separated from the base material of the filler and which subsequently escapes between the ring and walls of the groove to the exterior of the groove. This escape of the solvent prevents subsequent shrinkage of the filler or sealing material due to evaporation of the solvent with age, and the more or less solid filler thus remaining in the groove coacts with the walls of the recesses 9 and 10 aligned with recesses 13 and 13' formed in the ring and grooves, respectively, to resist outward movement of the connecting ring with respect to the pipe sections and thus oppose any stresses tending to separate the adjacent pipe sections. Furthermore, it will be observed that inasmuch as the central portion of the connecting ring is of substantially the same thickness as the width of the outer portion of the annular grooves 7, the pipe lengths connected thereto will be maintained by said ring in substantially coaxial alignment with each other.

The ring 8, instead of being constructed separate from the pipes as shown, may be fixedly secured to one of the pipe sections by casting an end portion of the pipe around an end portion of the ring when the pipe is being formed. In that case, the opposite end of each pipe section is provided with a groove 7 for receiving the free end of the ring 8 on the adjacent pipe section.

The structure shown in Figure 7 is substantially the same as that shown in Figures 1 to 6, inclusive, with the exception that the walls of the grooves 7 are provided with two pairs of annular recesses 13 and 13', while the connecting ring 8 is provided with but one annular recess 9 in each outer end portion. In addition to the above mentioned differences in the structure of the ring and grooves, the cross recesses 11 and 12 formed in the ring 8 are of sufficient length to connect the recesses 9 and 10 in the ring with the outer positioned recesses 13 and 13' formed in the walls of the grooves 7.

In the structure shown in Figure 8, each pipe length is provided with male and female, or bell and spigot, ends; that is, each pipe length has a recess formed in one end thereof by the inner and outer ferrules 3 and 3', while the other or opposite end has the ferrules associated therewith constructed to provide an annular ring 8' extending outwardly from said end in substantially central relation with the walls thereof. As shown in Figure 8, the inner and outer ferrules at the male end of each pipe length are constructed similar to the ferrules shown in Figures 1 and 2, with the exception that the annular ring portions 5 and 5' are extended outwardly, rather than inwardly, from the transverse portion 6 and 6' to form the annular ring 8' integral with the cylindrical portions 4 and 4'.

The ring 8' is provided with inner and outer annular recesses 22 and 23, respectively, arranged intermediate the ends of said ring. These recesses are formed by bending a portion of the ring members 5 and 5' inwardly toward each other, and the walls of the rings at the recesses 22 and 23 are preferably arranged to contact with each other for limiting the flexing movement of the rings as the same is forced into the groove 7' at the female end of an adjacent pipe length. The outer end portion of the ring 8' has the ring members 5 and 5' brought toward each other to form a sharp point, as at 19', to enable the ring to readily enter the sealing material 18 in the manner hereinbefore described in the structures shown in Figures 1 to 6, inclusive. The ring 8' has the outer end portion thereof, as 20', like the portions 20 in the ring 8, of slightly less thickness than the width of the groove 7'. As shown, the normal thickness of the ring at 20 is slightly greater than the distance between a pair of ribs 24 and 24' formed in the inner and outer rings 5 and 5', respectively, intermediate the ends thereof, which provide a restricted passage in the groove substantially midway between the ends thereof. These ribs 24 and 24' coact with the end portions 20' of the ring 8' for frictionally locking the ring in the groove. In this instance, when the pipe length being laid is moved toward the laid section, the walls of the end portions 20' of the ring 8' will be pressed toward each other during the passage thereof through the restricted portion of the groove 7' formed by the ribs 24 and 24' preventing ready removal of the connecting ring 8' from the groove in the adjacent pipe length.

In the construction of the pipe lengths shown in Figure 8, the cement forming the body portion 2 of the pipe will extend into the ring 8' between the rings 5 and 5' as far as the ribs 24 and 24' and thereby support the inner portions of the rings 5 and 5' against inward flexing movement toward each other, and thus maintain the thickness of the ring 8' at the inner portion thereof substantially equal to the width of the outer portion of the groove 7' for maintaining a close sliding fit between said ring and the walls of the groove. This inner portion of the ring 8' will thus coact with the outer portion of the groove 7' for maintaining the outer end 19' of the ring substantially midway between the outer and inner circumferential walls of the groove 7' as said end of the ring is moved into the sealing material 18, so as to equally distribute the material at opposite sides of the ring.

The quantity of the sealing material 18 provided in the inner end of the groove 7' is sufficient to completely fill the spaces between the inner and outer sides of the ring and adjacent portions of the groove 7', as illustrated in Figure 8. It is thus seen that the ring 8' is not only releasably locked within the groove 7' by the coaction of the end portion 20' with the ribs 24 and 24' but the passage around the outer end portion of the ring is completely sealed by the sealing material.

Although ring 8' is shown as being of special construction, it will be understood that this ring may readily be made to conform in general design to ring 8 shown in Figures 1 and 3 or of other suitable design if it is desired to do so.

In the structure shown in Figures 9 and 10, the connecting ring, as 26, is provided with annular grooves 27 extending inwardly from each end thereof, while each end of the pipe lengths is provided with a male portion 28 adapted to extend into the groove 27. Furthermore, it will be noted that each pipe length has but one ferrule, as 29, connected with the ends thereof. This ferrule has a cylindrical body portion 29' extending along the outer side of the pipe length adjacent the respective end thereof. The ferrule also has a portion 29" extending inwardly a short distance from the outer end of the body portion 2 of the pipe in spaced substantially parallel relation with the outer portion 29'. In other words, the outer end of the body portion 2 is covered for a short distance by the ferrule 29, which not only reinforces the end of the pipe but provides a substantially smooth surface for entering the grooves 27 and displacing the sealing material 18 provided therein. The male end of the pipe 28 is formed with a relatively sharp edge 19' adapted to readily enter the sealing material and distribute the same into equal portions at opposite sides of the male end 28 of the pipe. The male end 28 is also provided with inner and outer annular recesses 30 and 30' respectively, formed a relatively short distance from the outer end 19 of the pipe. The outer recess 30' is adapted to align with a similar recess 31 formed in the outer peripheral wall of the groove 27 to form an annular chamber surrounding the end of the pipe for the reception of the sealing material therein. The end 28 of the pipe may also be provided, as shown, with additional annular recesses, as 32 and 32', formed in the inner and outer peripheral surfaces thereof respectively, in inward spaced relation to the recesses 30 and 31'. These inner positioned recesses 32 and 32' are connected with the outer positioned recesses 30 and 31' respectively by cross or longitudinally extending recesses 33 and 33' formed in the ferrule member 29.

The connecting ring 26 may, as shown in Figure 10, be provided with a cross or longitudinal recess 34 in each end portion thereof for connecting a recess 31 with the adjacent end of the ring. These rings 26, when being assembled with the pipe lengths, are arranged with the recess 34 uppermost, so that if there is any excess sealing material in the groove 27 said material may escape through the recess 34 only after the spaces between the pipe end 28 and ring 26 are completely filled thereby.

In Figure 11 we have shown our novel pipe joint associated with adjacent ends of iron pipes which may or may not be coated with cement.

In this structure the iron pipe, as 35, has secured to each end thereof a flange member 36 as by rivets 37. Each of these flange members 36 have the outer end portions thereof arranged in radial spaced relation to the adjacent end of the pipe 35, to provide an annular groove 38 surrounding the pipe. Each flange member 36 is shown provided with an annular recess 39 formed in the inner circumferential surface thereof, intermediate the ends of the groove 38.

The connecting ring, as 40, illustrated in Figure 11, is of novel construction in that it comprises a core 41 composed of steel or other suitable substantially rigid material, and a cover 42 for the core composed of rubber or other flexible or rust resisting material or which will not corrode or deteriorate when subjected to the action of a chemical or alkaline substance in which the pipe may be laid or which may be caused to flow through the interior of the pipe. The ring 40 has the outer end portions thereof provided with inner and outer annular recesses 44 and 44' arranged a short distance from the ends thereof, the outer recess 44' being adapted to align with the recesses 39 formed in the flanges 36 to provide an annular chamber in each groove 38 for containing the sealing material. The ring 40 is also provided with additional inner and outer annular recesses 45 and 45' arranged in inward spaced relation to the recesses 44 and 44' which may be connected with the latter recesses by cross or longitudinally extending recesses 46 provided in the coating material 42. The ring 40 is also provided wtih an inner and outer annular boss or flange 47 and 47' respectively, of substantially the same radial width as the thickness of the pipe 35 and flange 36 arranged substantially midway between the ends thereof. These flanges 47 and 47' are adapted to extend between adjacent ends of the pipe sections and flanges 36 when the ring is mounted in the grooves 38 for maintaining the pipe lengths in cooperative relation with each other.

In the structure shown in Figure 12, the connecting ring 26 is shown associated with adjacent ends of two pipe lengths composed of iron or other suitable material which may or may not be covered with a coat of cement. The pipe, as 49, shown in Figure 12, has the end portions thereof offset to provide annular flanges 50 arranged in a plane at one side of the body portion of the pipe for extending into the groove 27 in the connecting ring 26. These flanges 50 are each preferably constructed with a pair of inner and outer annular recesses 51 and 51', respectively, one of which is adapted to register with the annular recess 31 formed in the ring 26 for providing an annular chamber for the reception of the sealing material.

These structures shown in Figures 11 and 12 are adapted more particularly for pipes of relatively small diameter, and these pipe lengths may be moved toward each other, during the laying of the pipe, by any suitable means gripping the walls of the pipe or engaging the outer end of the pipe being laid and which is clamped in any suitable manner to the section already laid.

It will now be observed that in any of the structures shown in the drawings the pipe lengths are maintained in substantially coaxial alignment with each other by the connecting rings which prevent the pipes from moving out of alignment with each other and the tendency thereof to leak, as is often the case due to settling of one pipe length lower than another after being laid. Also, it will be observed that leakage which so often occurs in other structures of pipe joints of this type caused by expansion and contraction of the pipe lengths will be eliminated by our novel joint structure, owing to the more or less plastic nature of the sealing material used and to the relatively large quantity of said sealing material which is confined within the chambers formed between the connecting rings and the pipe lengths by registering grooves or channels formed therein.

Furthermore, it will be obvious that the sealing material may be supplied to the grooves in the ends of the pipes, or in the ends of the connecting rings as the case may be, in the field during the laying of the pipe instead of at the time the pipe is constructed, if it is desired to do so.

Furthermore, the pipe 1 shown in Figures 1, 4, 5 and 6 may have one or the other or both ferrules 3, 3' omitted and the groove or channel 7 cast in the ends of the concrete body portions. Also, under certain conditions where the material from which the ferrules is made and the material to be passed through the pipe or coming in contact with the outside of the pipe are not friendly to each other, the cylindrical portion 4 or 4' of the ferrules may be omitted leaving the corresponding concrete portion of the pipe exposed.

Again, it will be obvious that while we have shown our novel joint structure associated with the pipe lengths circular in cross section, the same principle may be applied to other objects having substantially straight line, or more or less arcuate, edges to be joined together, such as concrete blocks or the like.

Although we have shown and particularly described the preferred embodiment of our invention and various modifications thereof, we do not wish to be limited to the exact constructions shown as it will be obvious that various other changes or modifications in the structure thereof may readily be made without departing from the spirit of the invention as set forth in the appended claims.

We claim:

1. In a joint structure of the class described wherein a pair of members to be joined are provided the one with an insert element and the second with a groove element receiving said insert element therein, the inner end portion of the groove being of greater cross sectional area than the adjacent forward end portion of the insert to provide a chamber adjacent said forward end portion of the insert for the reception of a sealing material, the outer end portion of the groove and the adjacent portion of the insert being of substantially the same cross sectional area so as to have a close sliding fit one with the other for determining the position of the forward end portion of the insert with respect to the chamber and to prevent ready escapement of the sealing material from the chamber during the movement of the insert into said grooves.

2. A joint structure as set forth in claim 1 wherein the groove and insert have adjacent surfaces intermediate the ends thereof provided with opposed recesses forming additional chamber means for the reception of a portion of said sealing material.

3. A joint structure as in claim 1 wherein one of said elements is provided with a recess in the surface of said outer portion thereof spaced from said chamber for the reception of a portion of said sealing material, and additional recess means in one of said elements extending inwardly from said first mentioned recess to provide a passage connecting said latter recess with said chamber.

4. A joint structure as set forth in claim 1 wherein said inner end portion of the groove element and the adjacent portion of the insert element have opposed portions of the surfaces thereof provided with recesses adapted to form an additional chamber in communication with the first mentioned chamber and a recess is provided in one of said elements at the outer end portion thereof spaced outwardly from said additional chamber for the reception of a portion of said sealing material, and at least one of said elements has the surface thereof provided with a passage means extending inwardly from the last mentioned recess for connecting the same with said chambers.

5. A joint structure of the class described wherein two members to be joined are provided the one with a connector element and the second with a groove element receiving the connector element therein, said connector element having an insert provided with an intermediate contracted portion and inner and outer side portions at opposite sides of the contracted portion arranged in substantially symmetrical relation with each other within said groove, said inner side portion being of less cross sectional area than the adjacent portion of the groove to form a chamber surrounding said inner side and contracted portions adapted to receive sealing material, the outer side portion being of substantially the same cross sectional area as the adjacent portion of the groove to have a close sliding fit therein for maintaining the inner side portion substantially centrally of said chamber and for preventing the ready escapement of sealing material from the chamber as the insert is moved into said groove.

6. A joint structure as defined in claim 5 wherein the groove is provided with a constrictive portion arranged in substantial registration with said contracted portion of the insert and said inner side portion of the insert is of greater cross sectional area than the constrictive portion of the groove and provided with resilient side walls adapted to flex laterally toward each other during said movement of the insert into the groove.

7. A joint for concrete pipe comprising aligned pipe sections having the adjacent ends thereof provided with annular grooves, a tubular connector mounted intermediate said pipe sections and having end insert portions extending into said grooves, the inner end portion of each of said grooves being of greater cross sectional area than the adjacent forward end portion of the respective insert to provide a chamber for the reception of a sealing material, the outer end portion of each of the grooves and the adjacent portion of the insert being of substantially the same cross sectional area so as to have a close sliding fit one with the other for maintaining the forward end portion of the insert in substantially symmetrical relation with the respective chamber and to prevent ready escapement of the sealing material from the chamber during the insertion of said insert in said groove.

8. A pipe joint as defined in claim 7 wherein each of said grooves is provided with an annular recess in opposite side walls thereof in communication with the respective chamber and each insert is provided with a pair of annular contracted portions arranged in spaced relation to each other axially of the respective insert, one of said contracted portions being adapted to register with the annular recesses in the groove when the insert is fully mounted in the groove and the other contracted portion being arranged intermediate the ends of the outer side portion of the insert, each of said inserts being provided with indentations arranged in circumferential spaced relation to each other providing passages for connecting the contracted portions of the insert.

ROBERT K. PEPPER.
SAMUEL C. V. PEPPER.